No. 640,870. Patented Jan. 9, 1900.
J. H. BUCKLEY.
POWER TRANSMISSION PULLEY.
(Application filed Dec. 1, 1898.)
(No Model.) 3 Sheets—Sheet 1.
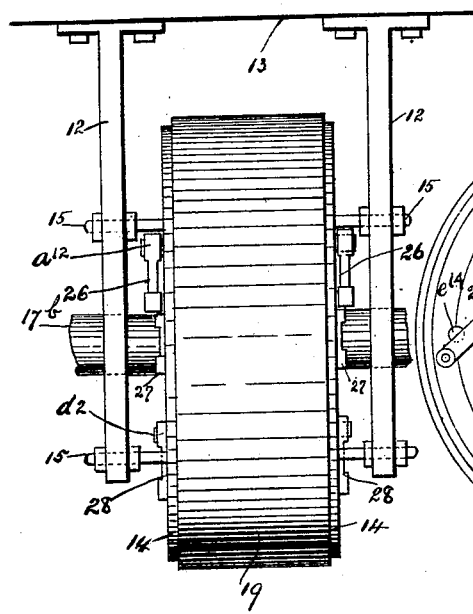
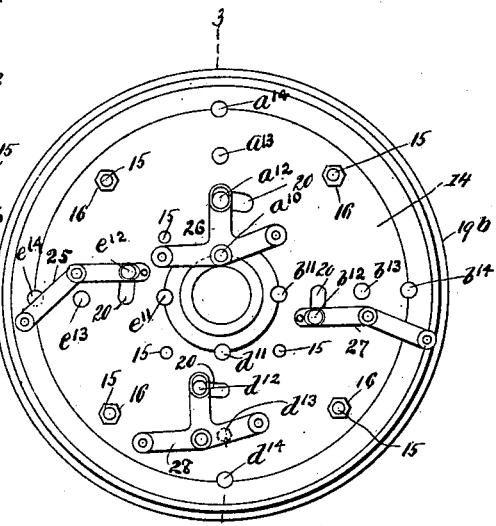
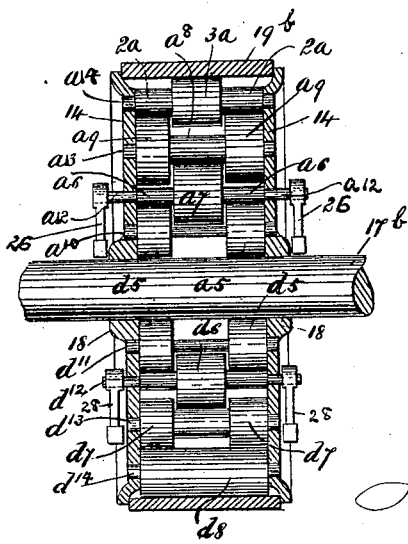
WITNESS
John Buckler
F. A. Stewart
INVENTOR
John H. Buckley
BY
Edgar Taled Co
ATTORNEYS
THE NORRIS PETERS CO., PHOTO-LITHO., WASHINGTON, D. C.

No. 640,870. Patented Jan. 9, 1900.
J. H. BUCKLEY.
POWER TRANSMISSION PULLEY.
(Application filed Dec. 1, 1898.)
(No Model.) 3 Sheets—Sheet 2.
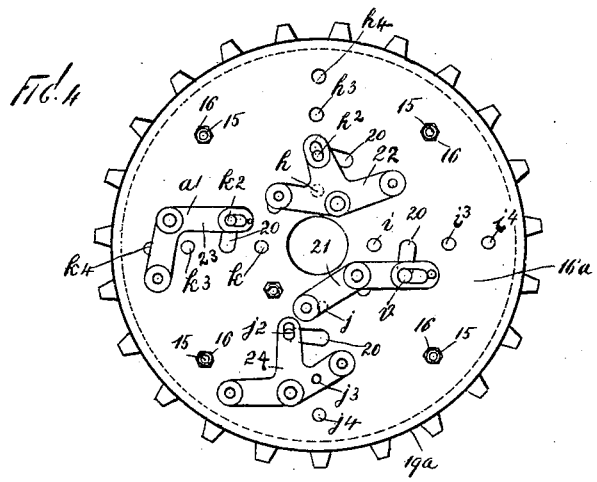
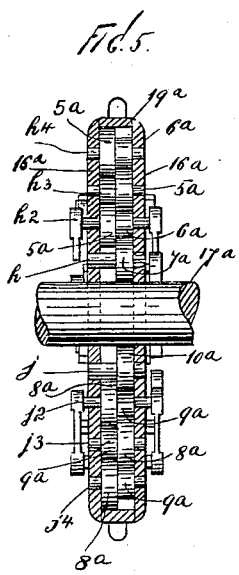
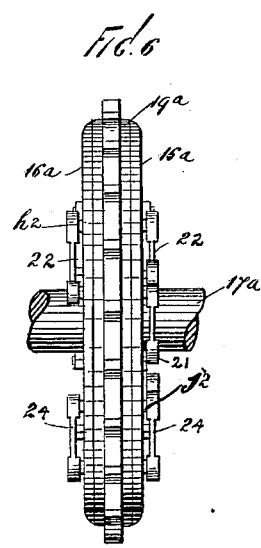
WITNESSES
John Buckler,
C. C. Olsen
INVENTOR
John H. Buckley,
BY
Edgar Sale & Co
ATTORNEYS.

No. 640,870. Patented Jan. 9, 1900.
J. H. BUCKLEY.
POWER TRANSMISSION PULLEY.
(Application filed Dec. 1, 1898.)
(No Model.) 3 Sheets—Sheet 3.
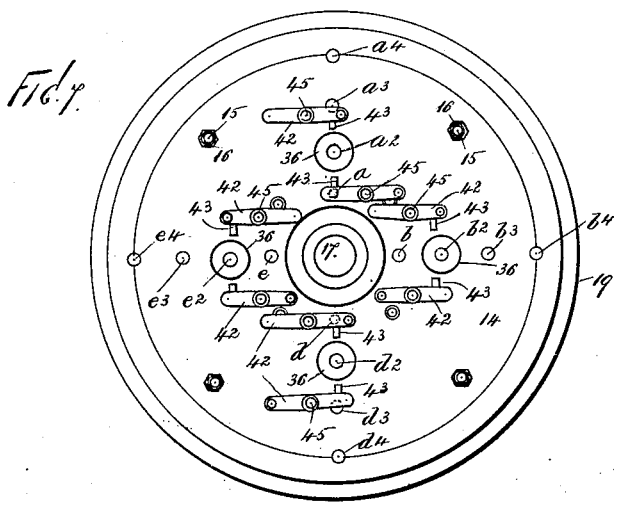
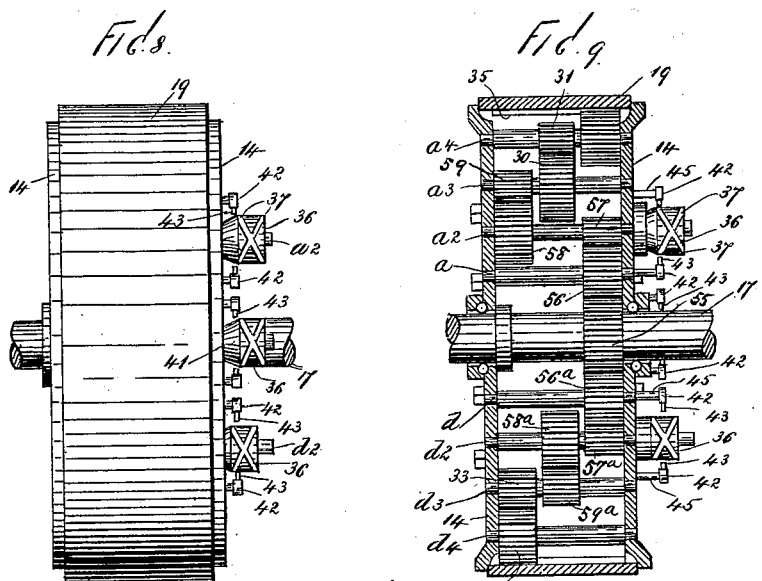
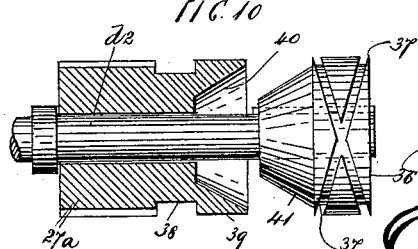
WITNESSES
John Buckler
C. C. Olsen
INVENTOR
John H. Buckley
BY
Edgar Tate & Co
ATTORNEYS

UNITED STATES PATENT OFFICE.

JOHN HENRY BUCKLEY, OF WASSAIC, NEW YORK.

POWER-TRANSMISSION PULLEY.

SPECIFICATION forming part of Letters Patent No. 640,870, dated January 9, 1900.

Application filed December 1, 1898. Serial No. 697,957. (No model.)

*To all whom it may concern:*

Be it known that I, JOHN HENRY BUCKLEY, a citizen of the United States, residing at Wassaic, in the county of Dutchess and State of New York, have invented certain new and useful Improvements in Power-Transmission Pulleys, of which the following is a full and complete specification, such as will enable those skilled in the art to which it appertains to make and use the same.

This invention relates to power-transmission pulleys of variable speed; and the object thereof is to provide an improved device of this class having improved means for varying the speed, a further object being to provide a power-transmission pulley comprising stationary sides through the center of which the main power-shaft passes, a revoluble rim or band mounted between the perimeters of said sides, and a plurality of radial rows of shafts mounted in said stationary sides between the central power-shaft and the revoluble band or casing, said radial rows of shafts being provided with friction or gear devices by which the movement of the power-shaft is transmitted to the revoluble rim or band, and said friction or gear device in the separate radial rows being of different diameters, whereby the speed of the rim or band may be increased or decreased, means being also provided for throwing either or all of said radial rows of shafts and the corresponding friction or gear devices into operation.

The invention is fully disclosed in the following specification, of which the accompanying drawings form a part, in which—

Figure 1 is a front elevation of my improved power-transmission pulley, showing the supports of the same and the main power-shaft passing therethrough; Fig. 2, a side view of the pulley detached; Fig. 3, a central vertical section on the line 3 3 of Fig. 2; Fig. 4, a view similar to Fig. 2 of a modified form of construction; Fig. 5, a central vertical transverse section of the pulley shown in Fig. 4; Fig. 6, a front view thereof; Fig. 7, a view similar to Fig. 2, showing another modification; Fig. 8, a front view of the pulley shown in Fig. 7; Fig. 9, a central transverse vertical section thereof, and Fig. 10 a partial section of Fig. 9.

In the drawings forming part of this specification the separate parts of my improvement are designated by numerals and letters of reference in each of the views, and in said drawings, reference being made to Figs. 1 and 3, inclusive, I have shown one form of my improved power-transmission pulley, together with the supports thereof, and the power-shaft, said supports, as shown in Fig. 1, consisting of hangers 12, secured to any suitable support 13.

The pulley proper consists of two stationary sides 14, which are connected by transverse bolts 15, and these transverse bolts are also passed through the hangers 12 and connect the pulley therewith, and the bolts 15 are also provided with nuts 16, which hold the sides 14 in proper position.

The main power-shaft $17^b$ passes centrally through the sides of the pulley, said sides of the pulley being provided with central bosses or hubs 18, and, if desired, ball-bearings may be provided between the main power-shaft and the bosses or hubs 18, said ball-bearings being shown in Fig. 9.

The revoluble rim or band $19^b$ is mounted between the perimeters of the sides 14 of the pulleys, as clearly shown in Fig. 3, and the said pulley is provided with a plurality of radial rows of shafts between the central power-shaft and the rim or band $19^b$, said radial rows of shafts, as shown in the drawings, being four in number, one row of said shafts being designated in Fig. 2 by the reference-letters $a^{10}$, $a^{12}$, $a^{13}$, and $a^{14}$, another by the reference-letters $b^{11}$, $b^{12}$, $b^{13}$, and $b^{14}$, another by the reference-letters $d^{11}$, $d^{12}$, $d^{13}$, and $d^{14}$, and another by the reference-letters $e^{11}$, $e^{12}$, $e^{13}$, and $e^{14}$.

The inner shaft $a^{10}$ of the radial row of shafts of which said shaft $a^{10}$ forms a part is provided adjacent to each end with friction-rollers $a^5$, operated by the power-shaft, and these friction-rollers bear on corresponding friction-rollers $a^6$, of much less diameter, on the adjacent shaft $a^{12}$, and said shaft $a^{12}$ is provided centrally with a friction-roller $a^7$, adapted to operate in connection with a central friction-roller $a^8$ on the shaft $a^{13}$, and said shaft $a^{13}$ is provided adjacent to each end with a friction-roller $a^9$ of much greater diameter than the friction-roller $a^8$, and the rollers $a^9$ operate in connection with corresponding friction-rollers $2^a$ on the outer shaft $a^{14}$, which are of less diameter than the said friction-rollers $a^9$.

The main power-shaft $17^b$ is operated in the usual or any desired manner, and power is transmitted therefrom to the shaft $a^{10}$ through the friction-rollers $a^5$ and from said friction-rollers $a^5$ to the shaft $a^{12}$ through the friction-rollers $a^6$, and the friction-roller $a^7$ on the shaft $a^{12}$ transmits the power to the friction-roller $a^8$ on the shaft $a^{13}$, and the friction-rollers $a^9$ on the shaft $a^{13}$ transmit the power to the shaft $a^{14}$ through the friction-rollers $2^a$, and said shaft $a^{14}$ is provided with a central friction-roller $3^a$, by which the power is transmitted to the rim or band $19^b$.

In practice a belt is placed on the rim or band $19^b$ and the power transmitted thereby to a supplemental pulley mounted on a power-transmission shaft, said supplemental pulley and power-transmission shaft being not shown.

It will be understood that the speed of the band or rim $19^b$ when operated by the radial rows of shafts $a^{10}$, $a^{12}$, $a^{13}$, and $a^{14}$ will depend entirely upon the size and arrangement of the intermediate friction-rollers on said shafts, and on the radial row of shafts designated by the reference-letters $d^{11}$, $d^{12}$, $d^{13}$, and $d^{14}$ in Fig. 3 a somewhat similar arrangement of friction-rollers is employed, the inner shaft $d^{11}$ being provided with two rollers $d^5$, operating in connection with corresponding friction-rollers on the shaft $d^{12}$, and the shaft $d^{12}$ being provided with a central friction-roller $d^6$, operating in connection with a central roller on the shaft $d^{13}$, and said shaft $d^{13}$ being provided with two friction-rollers $d^7$, which operate in connection with a single roller $d^8$ on the shaft $d^{14}$, through which the power is transmitted to the rim or band $19^b$. It will also be understood that all the friction-rollers in each of the radial rows are rigidly secured to their corresponding shafts or formed integrally therewith, and said shafts are revoluble in the operation of the device. It will also be seen that by reason of the friction-rollers on the shafts $a^{13}$ and $a^{14}$ the radial row of shafts of which said shafts $a^{13}$ and $a^{14}$ form a part will give the band or rim $19^b$ much greater speed than will be given thereto by the radial row of shafts $d^{11}$, $d^{12}$, $d^{13}$, and $d^{14}$.

The radial rows of shafts designated by the reference-letters $b$ and $e$ are not shown in detail; but it will be understood that in practice these rows of shafts are provided with friction-rollers of a general form and arrangement similar to that of the radial rows of shafts designated by the reference-letters $a$ and $d$, the difference being that each of said radial rows of shafts is designed to give the rim or band $19^b$ a different speed. I have also shown in Figs. 1, 2, and 3 devices for throwing either of said radial rows of shafts in or out of gear or in or out of operation, and for this purpose the second shaft in each radial row of shafts, counting from the center of the pulley, is mounted in slots 20 in the sides 14 of the pulley, and pivoted to the said second shaft of each radial row is a crank-lever, one arm of which is connected with said shaft.

The levers connected with the shaft $e^{12}$ are designated by the reference-numeral 25, those connected with the shaft $a^{12}$ by the reference-numeral 26, those connected with the shaft $b^{12}$ by the reference-numeral 27, and those connected with the shaft $d^{12}$ by the reference-numeral 28, and the levers 26 and 28 are preferably provided with three arms and the other two with two arms, or this arrangement may be reversed. By operating these crank-levers the second shaft of each of the radial rows may be thrown out of connection with the shafts on each side thereof, and by means of this construction either of said radial rows of shafts may be thrown into gear with the main power-shaft $17^b$ whenever desired, and the said crank-levers may be operated in any desired manner, so as to throw one of the radial rows of shafts into gear and all the rest out of gear.

In Figs. 4 to 6, inclusive, I have shown a modified form of construction, by which my improved power-transmission pulley is designed for use in connection with the sprocket-wheel on pedal-shafts of bicycles or similar vehicles, and in this form of construction the pulley consists of side plates $16^a$. The central shaft $17^a$ represents the pedal-shaft and the rim or band $19^a$ the sprocket-wheel, which is provided with the usual sprocket-teeth. In this form of construction the power-transmission pulley is made much narrower than in the form shown in Figs. 1 and 3, this result being accomplished by making the radially-arranged shafts much shorter than in said figures and by providing said shafts with only two friction rollers or gears. In this form of construction four rows of the radially-arranged shafts are employed, and the shafts of one of said rows are designated by the reference-letters $h$, $h^2$, $h^3$, and $h^4$, another by the reference-letters $i$, $i^2$, $i^3$, and $i^4$, and another by the reference-letters $k$, $k^2$, $k^3$, and $k^4$. Each of the shafts in each of the radial rows is provided, with the exception of the inner shaft, with one large and one small friction bearing or roller, and in the radial row of shafts designated by the reference-letter $h$ the larger bearing or roller on each of said shafts is designated by the reference-letter $5^a$ and the smaller by the reference-letter $6^a$, and the inner shaft in said row is provided with a single large friction bearing or roller $7^a$. The shafts of the radial row designated by the reference-letter $j$ are also provided with corresponding large and small friction rollers or bearings, of which the larger are designated by the reference-numeral $8^a$ and the smaller by the reference-numeral $9^a$, and the inner shaft is provided with a single large roller or bearing $10^a$. With this exception the construction and operation are exactly the same as that of the construction shown in Figs. 1 to 3, inclusive, and crank-levers 21, 22, 23, and 24 are employed for the same purpose as in Figs. 1 to 3, and the second shaft in each radial row, counting from the center, is mounted in a slot 20 the same as shown in Fig. 2. When this form of construction is used in connection with or as a sprocket-wheel for a bicycle or similar vehicle, the side plates $16^a$ are rigidly secured to the frame of the vehicle in any desired manner, it being understood that it is necessary that said side plates be held firmly, as in Fig. 1.

In Figs. 7 to 10, inclusive, I have shown another modification of the construction shown in Figs. 1 to 3, and in this modification the same radial rows of shafts are mounted between a central power-shaft 17 and a band or rim 19; but in this form of construction I substitute for the friction-rollers on said shafts ordinary gear-wheels and pinions. The power-shaft 17 is provided with a gear-wheel 55, which operates in connection with corresponding gear-wheels 56 and $56^a$ on the shafts $a$ and $d$, and the gear-wheels 56 and $56^a$ on the shafts $a$ and $d$ operate in connection with pinions 57 and $57^a$ revolubly mounted on the shafts $a^2$ and $d^2$, and said shafts $a^2$ and $d^2$ are provided with gear-wheels 58 and $58^a$, which operate in connection with wheels or pinions 59 and $59^a$ on the shafts $a^3$ and $d^3$. The shaft $a^3$ is provided also with a gear-wheel 30, operating in connection with a pinion 31 on the shaft $a^4$, and said shaft $a^4$ is provided with a gear-wheel 32, operating in connection with an internal gear 35 on the rim or band 19. The shaft $d^3$ is provided with a gear-wheel 33, which operates in connection with a gear-wheel 34 on the shaft $d^4$, and said wheel 34 is also adapted to operate in connection with the internal gear 35 on the rim or band 19.

The form, size, and arrangement of the gear-wheels and pinions on the shafts of each of the radial rows of shafts with which the pulley is provided are such that each of said radial rows of shafts is adapted to give the rim or band 19 a different speed, and in this form of construction each of said radial rows of shafts and their connecting-gear may be thrown out of connection with the main power-shaft 17 whenever desired.

The operation is accomplished by the following construction. As hereinbefore stated, the pinions 57 and $57^a$ on the second shaft of each of said radial rows is adapted to turn on the shaft on which it is mounted, and said shafts are projected at one end and provided with a slidable clutch-head 36, the body portion of which is cylindrical in form and provided with intersecting diagonal grooves, which wind around the same, as shown at 37. Each of the pinions 57 and $57^a$ is also provided at its outer end with a neck 38, having a collar or rim 39, in which is formed a conical-shaped friction-clutch socket 40, adapted to receive the inner conical end 41 of the clutch-head 36, and pivoted to one side of the pulley at each side of each of said clutch-heads 36, as shown in Fig. 7, is a lever 42, and the ends of said levers 42 adjacent to the said clutch-heads are provided with inwardly-directed pins 43, which are adapted to operate in the grooves 37 in said clutch-heads. It will be understood that the pinions 57 and $57^a$ are free to revolve on the shafts on which they are mounted, but cannot slide thereon, and when the clutch-heads 36 are forced inwardly they engage with the collars or rims 39, formed integrally with said pinions, and said pinions are forced to revolve with the shafts on which they are mounted. Normally, however, the clutch-heads 36 are out of engagement with said corresponding pinion 57, and in this position of the said parts all of the radial rows of shafts and their connected gearing with which the pulley is connected are out of gear with the central power-shaft 17, and whenever it is desired to throw the pulley into operation one or more of said clutch-heads are forced inwardly, so as to engage its corresponding pinion.

The operation of the clutch-heads 36, as described, is accomplished by the levers 42, said clutch-heads being each provided with two of said levers, one of which is adapted to force the clutch-head inwardly and the other outwardly, and said levers may be operated by hand or in any desired manner. With this construction, as with that shown in Figs. 1 to 3, inclusive, the separate radial rows of shafts and the gearing with which said shafts are provided are designed to give the band or rim 19 a different rate of speed, and it will be apparent that either of said radial rows of shafts may be thrown into gear with the central power-shaft whenever desired, and the levers 42, by which the clutch-heads 36 are operated, are mounted on pins 45, which project from the sides of the pulley, as shown in Fig. 9. It will also be observed that the ends of the radial rows of shafts in the construction shown both in Figs. 3 and 9 are smaller than the shaft proper, and this construction prevents the longitudinal movement of said shafts, while the friction bearings or rollers in Fig. 3 serve for a similar purpose.

It will thus be seen that in each of the forms of construction herein shown and described my improved power-transmission pulley is provided with a plurality of radial rows of shafts and intermediate gearing by which the power is transmitted from the main power-shaft, which passes centrally through the pulley to the rim or band mounted on the perimeter of the pulley, the gearing being a friction-gearing in two cases and a positive gearing in the other, and each of these constructions is well adapted to accomplish the result for which it is intended.

It will be observed that the radial rows of shafts in the construction shown and described each contains four shafts and corresponding gears, and by reason of this construction the rim or band is always revolved in one direction; but it is obvious that my invention is not confined to any particular number of shafts and gears, and if an odd number of shafts be employed the rim or band will be turned in the opposite direction, whether said number be less or more than four, and it is obvious that my improved power-transmission pulley can be operated in either direction, as convenience may dictate. It will also be apparent that other changes in and modifications of the construction herein described may be made without departing from the spirit of my invention or sacrificing its advantages, and I reserve the right to make all such alterations therein as fairly come within the scope of my invention.

Having fully described my invention, I claim as new and desire to secure by Letters Patent—

1. A power-transmission pulley, comprising stationary side plates or disks, a main power-shaft passing centrally therethrough, a rim or band mounted between the perimeters of said side plates or disks, and a plurality of radial rows of shafts mounted between the central power-shaft and the rim or band, said radial rows of shafts being provided with gearing for transmitting variable degrees of speed from the power-shaft to the rim or band, and means for throwing either of said radial rows of shafts into gear with said main power-shaft, substantially as shown and described.

2. A power-transmission pulley, comprising stationary side plates or disks, a main power-shaft passing centrally therethrough, a rim or band mounted between the perimeters of said side plates or disks, and a plurality of radial rows of shafts mounted between the central power-shaft, and the rim or band, said radial rows of shafts being each provided with gearing, whereby the movement of the power-shaft is transmitted to the rim or band of each of said radial rows of shafts, the gearing on each of said radial rows of shafts being such as to give the rim or band a different speed, and means for throwing each of said radial rows of shafts out of gear with the main central shaft, substantially as shown and described.

3. A power-transmission pulley, comprising stationary side plates or disks, a main power-shaft passing centrally therethrough, a rim or band mounted between the perimeters of said side plates or disks, and a plurality of radial rows of shafts mounted between the central power-shaft, and the rim or band, said radial rows of shafts being each provided with gearing, whereby the movement of the power-shaft is transmitted to the rim or band by each of said radial rows of shafts, the gearing on each of said radial rows of shafts being such as to give the rim or band a different speed, and means for throwing each of said radial rows of shafts out of gear with the main central shaft, consisting of a clutch device operating in connection with one shaft of each of said radial rows, substantially as shown and described.

4. A power-transmission pulley, comprising two side plates or disks, a rim or band mounted between the perimeters thereof, a central power-shaft passing through said side plates or disks, a plurality of radial rows of shafts mounted in said side plates or disks between the central shaft, and the rim or band, each of said radial rows of shafts being provided with a different form of gearing, whereby the movement of said central shaft is transmitted to the rim or band, and means for throwing either or all of said radial rows of shafts into or out of gear with the central power-shaft, substantially as shown and described.

5. A power-transmission pulley, comprising stationary sides, a central shaft passing therethrough, a revoluble rim or band mounted between the perimeters of said sides, and a plurality of radial rows of shafts mounted between said central shaft and said rim or band, the shafts of each of said radial rows being geared in connection, and also in connection with said central shaft and said rim or band, and means for throwing either of said radial rows of shafts into or out of gear with said central shaft and said rim or band, substantially as shown and described.

6. A power-transmission pulley, comprising stationary sides, a power-shaft passing centrally therethrough, a revoluble rim or band mounted between the perimeters of said sides, and a radial row of shafts mounted between the power-shaft and said rim or band, said last-named shafts being provided with friction-gearing for transmitting the movement of the power-shaft to the rim or band, substantially as shown and described.

In testimony that I claim the foregoing as my invention I have signed my name, in presence of the subscribing witnesses, this 28th day of November, 1898.

JOHN HENRY BUCKLEY.

Witnesses:
E. E. BALLARD,
FRANK BUCKLEY.